United States Patent
Szeliga

[19]

[11] Patent Number: 6,067,353

[45] Date of Patent: May 23, 2000

[54] METHOD AND APPARATUS FOR DETECTING A CALL WAITING SIGNAL ON A TELEPHONE LINE CONNECTED TO A MODEM

[75] Inventor: Philip C. Szeliga, Utica, N.Y.

[73] Assignee: Human Electronics, Inc., New Hartford, N.Y.

[21] Appl. No.: 09/204,671

[22] Filed: Dec. 3, 1998

[51] Int. Cl.[7] .................................................. H04M 11/00

[52] U.S. Cl. ......................................... 379/93.35; 379/215

[58] Field of Search ............................... 379/93.35, 39.05, 379/93.09, 93.17, 93.23, 93.26–93.28, 93.37, 215

[56] References Cited

U.S. PATENT DOCUMENTS

| | | |
|---|---|---|
| 4,852,151 | 7/1989 | Dittakavi et al. . |
| 4,995,074 | 2/1991 | Goldman et al. . |
| 5,287,401 | 2/1994 | Lin . |
| 5,491,744 | 2/1996 | Kikinis . |
| 5,519,767 | 5/1996 | O'Horo et al. . |
| 5,550,908 | 8/1996 | Cai et al. . |
| 5,651,060 | 7/1997 | Cohn et al. . |
| 5,930,347 | 7/1999 | Louvel ................................. 379/93.35 |

*Primary Examiner*—Wing F. Chan
*Attorney, Agent, or Firm*—Wall Marjama Bilinski & Burr

[57] ABSTRACT

A method and related apparatus are provided for detecting the presence of a call waiting signal on a telephone line, where the call waiting signal is embedded in various signals. The call waiting signal frequency is isolated from the various other frequencies. The isolated call waiting frequency is then biased so that only the positive voltage portions of the signal are allowed to pass. Each positive voltage pulse as well as the zero voltage pulses are then sampled to determine whether they are representative of a biased call waiting signal. Each time a determination is made, one is added to a count on an up-down counter. When the count reaches a predetermined number, a call waiting signal is detected on the telephone line. Preferably an alarm signals the presence of a detected call waiting signal to the user. A disconnect switch interrupts a modem so that a person using the modem on the same telephone line will have sufficient time to answer a detected incoming call.

40 Claims, 11 Drawing Sheets

METHOD AND APPARATUS FOR DETECTING A CALL WAITING SIGNAL ON A TELEPHONE LINE CONNECTED TO A MODEM

FIELD OF THE INVENTION

This invention relates to the field of modems, and more particularly to detecting the presence of a call waiting signal on a telephone line which is actively connected to a modem in tandem with a computer, fax machine, or other device.

BACKGROUND OF THE INVENTION

When a device such as a personal computer, fax machine, etc is connected to a telephone line, a modem is required to receive an incoming analog signal from the telephone line and convert the signal to a digital signal for use by the computer. Conversely, the modem receives outgoing digital signals from the computer and converts them into an analog signal for transmission over the telephone line.

An "online" modem is engaged electrically in parallel with the telephone line when a single telephone line is used. Therefore, a calling party attempting to place a phone call will receive a busy signal if the computer is in use, and the computer user will be unaware of the attempted call. The calling party must guess when the user is not on the computer, fax machine, etc. in order to place an incoming phone call, which may take many attempts, thereby increasing the traffic on the telephone network. Furthermore, important calls may go undetected by the computer or fax machine user.

A call waiting feature is offered by many telephone companies. This feature alerts a person who is in the middle of an ongoing telephone call that another party is attempting to contact them by telephone. A typical call waiting signal is generally made up of a first call waiting signal at a predetermined frequency (e.g., 440 hertz) for a predetermined duration (e.g., 0.5 seconds) followed by a delay period (e.g., 10 seconds) followed by a second call waiting signal similar to the first call waiting signal. The call waiting signal is embedded in various other signals along the telephone line, however, and is not easily discernible. Further, when a computer or fax modem is connected and operational, there are no means to hear the call waiting signal.

Though the call waiting feature works well between telephone users, the feature is incompatible when applied to the computer or fax machine user. There have been several attempts to design a modem that can detect a call waiting signal. Modems attempting to incorporate such a feature to date, however, are not reliable. In addition, modems having call waiting detection capability are expensive and reduce the transforming capability of the modem.

U.S. Pat. No. 5,287,401 to Lin, for example, discloses a modem that detects a call waiting signal from a telephone line. The modem attempts to monitor the presence of the call waiting frequency. Upon detection, the modem then monitors the signal for what would be the typical duration of the call waiting signal. The signal is subsequently monitored for the absence of a call waiting signal (e.g., the delay period) and then over a period equivalent to the second call waiting signal. This detection technique has several problems. First, the technique is not reliable, because a random 440 hertz signal could be generated amid the rapidly changing analog modem signals as data is being transferred. Second, this monitoring technique takes a longer time than the call waiting signal is on the line, due to the time period used for monitoring for the absence of a call waiting signal (e.g., the delay period). Moreover, the modem must transfer its function to monitor for a frequency rather than transform data, which wastes modem capability. Finally, by the time a modem detects the call waiting signal and the user logs off the modem connection, the user may miss the call anyway.

SUMMARY OF THE INVENTION

Therefore, it is an object of the present invention to overcome the limitations and shortcomings of the prior art.

It is a further object of the present invention to have a device that can detect a call waiting signal on a telephone line during the time the call waiting signal is actually being transmitted.

It is yet another object of the present invention to provide a device which can detect and allow simple and quick disconnection with the modem, allowing the user ample time to answer an incoming phone call.

It is still another object of the present invention to provide a call waiting indicator which can notify the user that a call is incoming, so that a decision can be made whether or not to accept the call.

These and other objects are accomplished by a method for detecting a call waiting signal on a telephone line having multiple signals, wherein said telephone line is actively electrically connected with a modem. The call waiting signal comprises a first call waiting signal having individual positive voltage pulses alternating with individual negative voltage pulses, a delay period and then a second call waiting signal having individual positive voltage pulses alternating with said individual negative voltage pulses, said method comprising the steps of:

isolating said call waiting signal from other signals embedded in said telephone line, and detecting the presence of said isolated call waiting signal prior to the beginning of said delay period.

The detecting step further includes the step of sampling individual pulses of the first call waiting signal and counting the number of pulses that are representative of a call waiting signal.

In the preferred embodiment, the isolating step includes the step of biasing said call waiting signal so that the biased call waiting signal includes individual positive voltage pulses alternating with individual zero voltage pulses.

According to a preferred embodiment, each pulse of the biased call waiting signal is sampled a first predetermined number of times, and if a second predetermined number of positive results are detected, then the individual pulse or zero voltage pulse is determined to be that of the call waiting signal. Each time a pulse or zero voltage pulse is determined to be representative of a pulse of a biased call waiting signal, a counter is incremented. However, each time a pulse or zero voltage pulse is not determined to be representative of a pulse of a biased call waiting signal, the counter is decremented. The count is not allowed to be less than zero. When the counter reaches a predetermined number, a call waiting signal is known to be present on the telephone line. The call waiting signal normally can be detected at two points; first, at or before the first call waiting signal is completely transmitted and second, at or before the second call waiting signal is completely transmitted. At each of these detection points, an alarm will signal to the user that another party is attempting to contact them on the telephone. Preferably, the device includes a quick disconnect switch for disconnecting the modem from the telephone line upon detection of an incoming call waiting signal, thus allowing the user sufficient time to answer the telephone call.

Other objects, features, and advantages of the present invention will be apparent from the following Detailed Description of the Invention which is to be read in conjunction with the accompanying drawings.

DETAILED DESCRIPTION OF THE INVENTION

Figure 1:
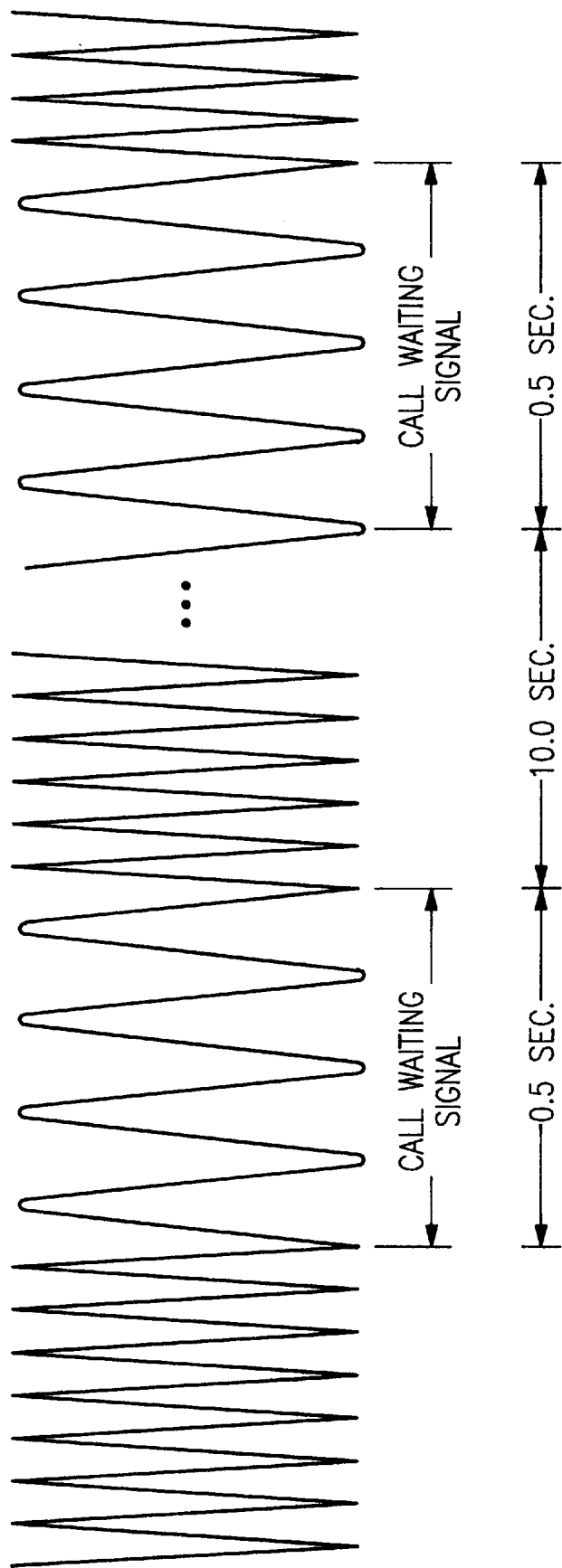
FIG. 1 is a representation of a typical call waiting signal as embedded in a typical telephone line signal.

Referring to FIG. 1, there is depicted a specific call waiting signal as it occurs in time on a telephone line. The call waiting signal is typically comprised of a first call waiting signal at 440 Hz for a duration of 0.5 seconds, followed by a ten second delay and then a second call waiting signal at 440 Hz for a duration of 0.5 second. The following embodiment relates to the above specific call waiting signal, though it should be readily apparent to one of skilled in the field that an indicator utilizing the inventive concepts described herein can be configured for different signal patterns.

Figure 2:
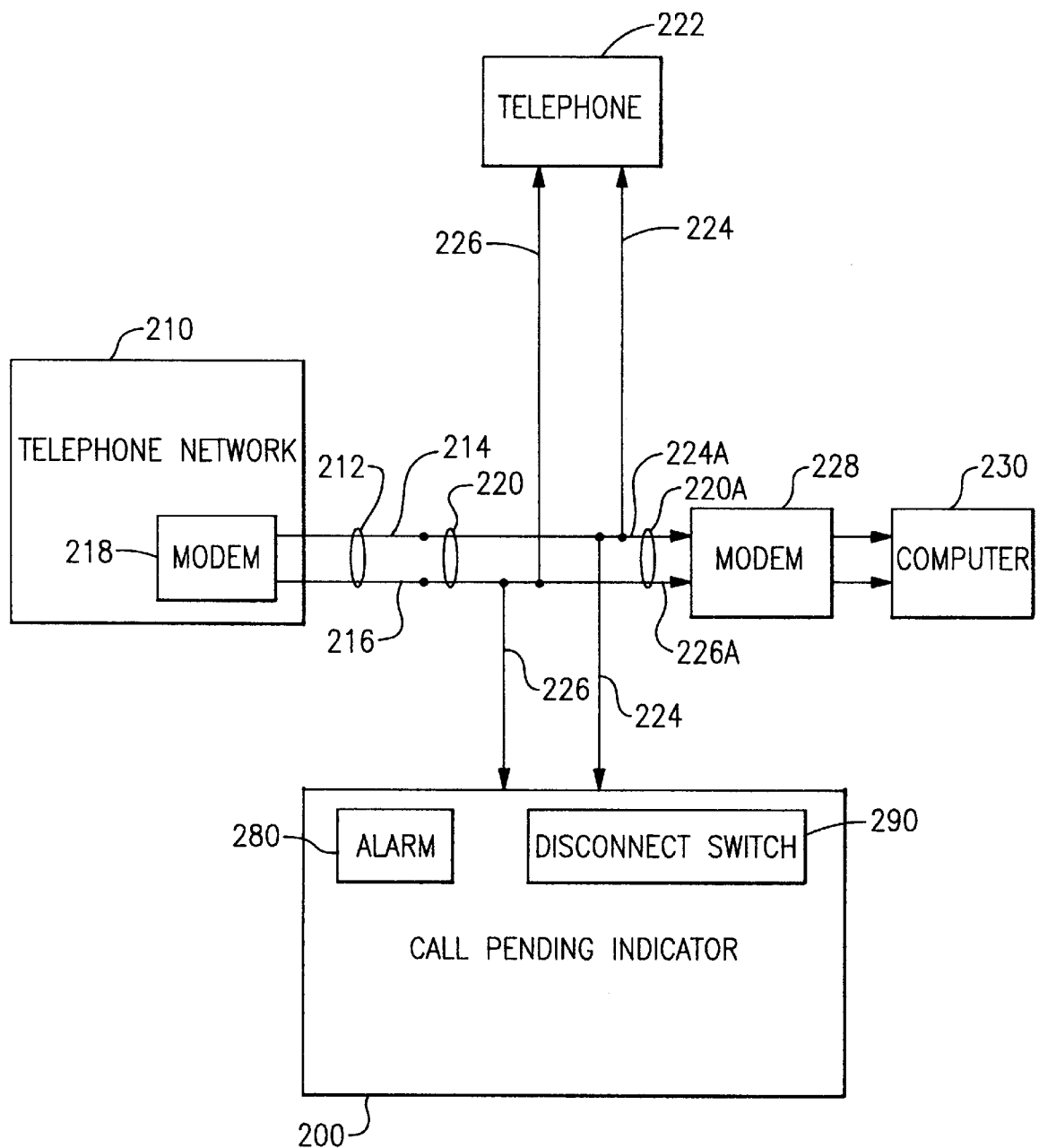
FIG. 2 is a schematic diagram of a call pending indicator in accordance with the present invention.

Turning to FIG. 2, there is shown a telephone network 210 having a modem 218 for transmitting analog data over a telephone line 212. The telephone network 210, for example, could be the Internet. The telephone line 212 comprises a tip path line 214 and a ring path line 216, that interfaces with a user telephone 222 and a user computer 230 via a modem 228. A user telephone line 220 has a user tip path line 224 that interfaces with the network tip path line 214, and a user ring path line 226 that interfaces with the network ring path line 216. According to the preferred embodiment, a call pending indicator 200 is coupled to the user telephone line 220, the user tip path 224 and the user ring path 226 and is, therefore, accordingly electrically common with the network telephone line 212.

Still referring to FIG. 2, a user may desire to transmit data to a personal computer 230 and receive data from the personal computer 230, through network telephone line 212. In such a case, user telephone line 220 terminates in a user modem 228, which interfaces with personal computer 230, and telephone network 210 terminates in a network modem 218 in common with network tip path 214 and ring path 216, with data flowing between modems 218 and 228. The call pending indicator 200 of the present invention couples to the user telephone line 220, and is accordingly electrically parallel with the user modem.

The call pending indicator 200 allows a computer user to use the Internet via the modem 228 and the telephone line 220, while still being alerted as to a call waiting on the same telephone line 220. The call pending indicator 200 monitors the signals being transmitted over the telephone line 220. When a call waiting signal is detected, the call pending indicator 200 signals an alarm 280 to the user. The user may then depress a disconnect switch 290 on the call pending indicator 200 to quickly disconnect the modem 228 from the telephone line 220. The user may then answer the telephone call on the telephone 222 without first having to shut down an existing Internet connection. As is readily apparent, the call pending indicator 200 of the present invention is electrically parallel with the telephone 222.

Figure 3:
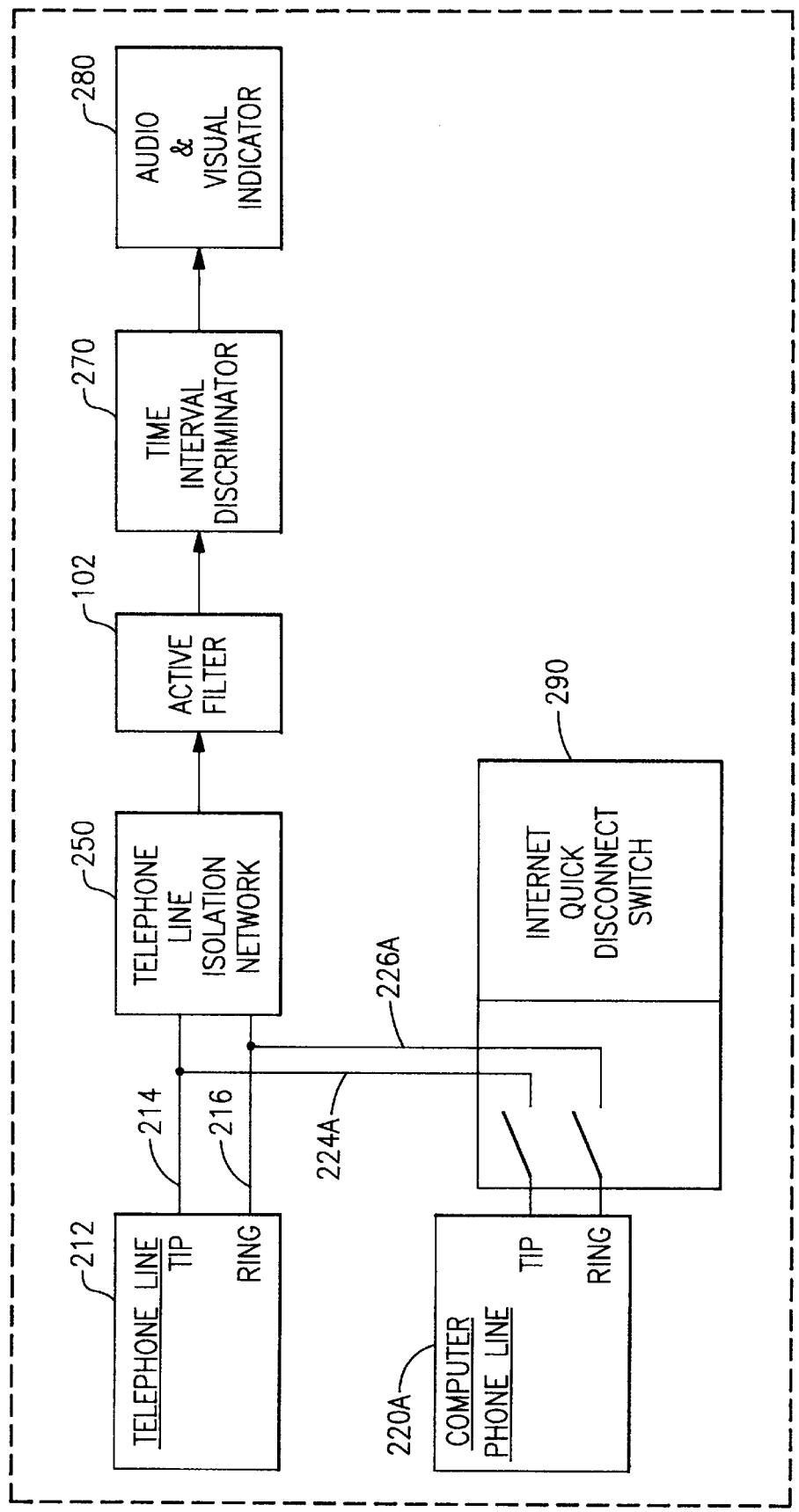
FIG. 3 is a block diagram of the call pending indicator of FIG. 2 in relation a telephone line and computer modem.

Referring to FIG. 3, there is shown a telephone line 212 having a tip path line 214 and a ring path line 216 in parallel with a computer phone line 220A having computer tip path line 224A and computer ring path line 226A. In brief, a telephone line isolation network 250 is used to block the direct current voltage from the telephone signal. A disposed active filter 102 allows only the call waiting frequency band to pass through, while blocking substantially all other frequencies. A time interval discriminator 270 determines if a signal passing through the filter 102 is a call waiting signal. If the discriminator 270 determines that there is a call waiting signal present on telephone line 212, then an audio/video indicator 280 will provide an audible or visual signal to the user of a call waiting. An Internet quick disconnect switch 290 allows the user to quickly disconnect the computer phone line 220A from the telephone line 212, thereby permitting the user to quickly answer the call waiting. The audio/video indicator 280 and the Internet quick disconnect switch 290 are part of the call pending indicator 200 and are physically independent of both the computer 230 and the user modem 228.

Figure 4:
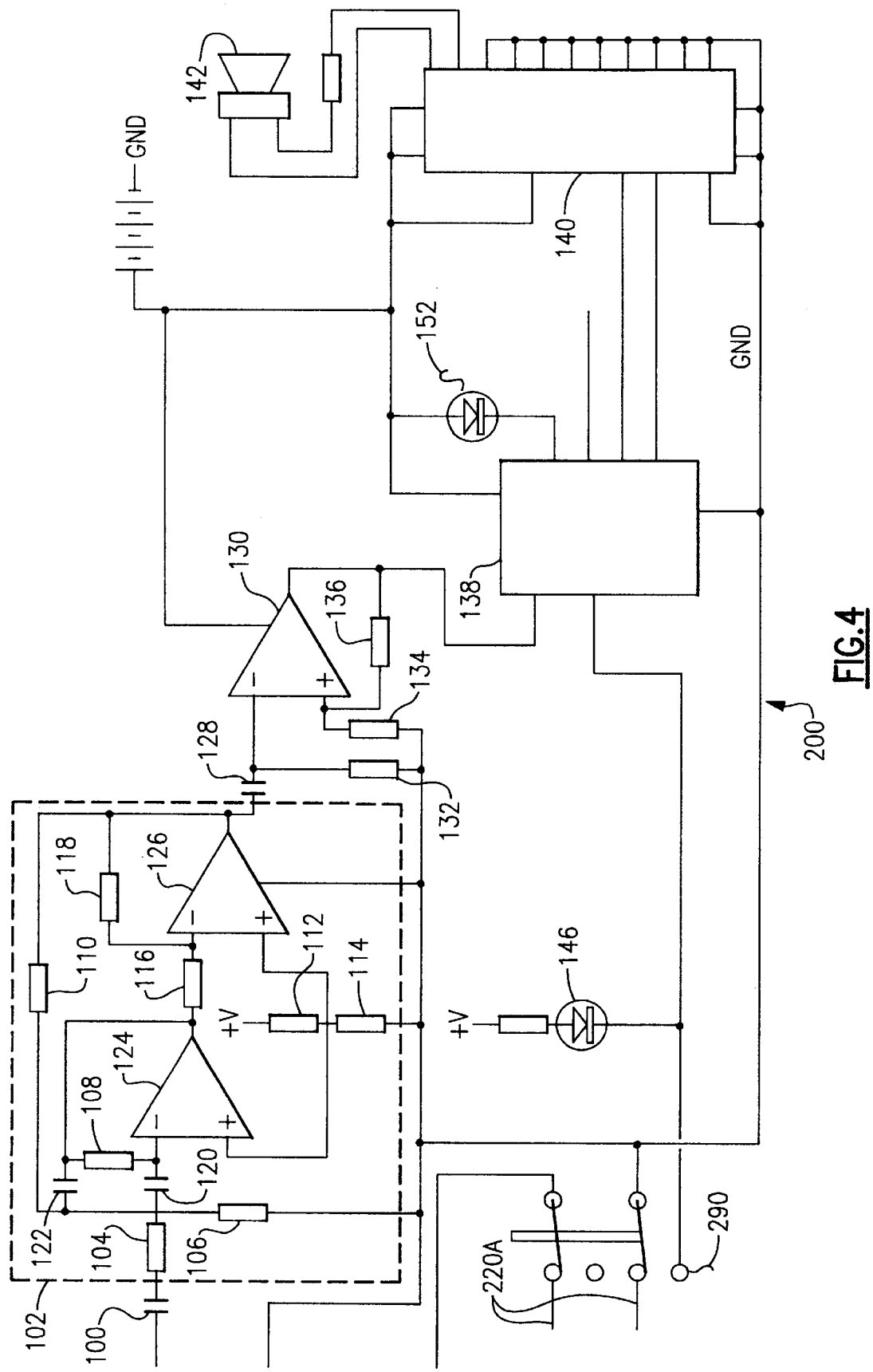
FIG. 4 is an electrical schematic diagram of the call pending indicator of FIGS. 2 and 3 in accordance with a preferred embodiment of the present invention.
Figure 5:
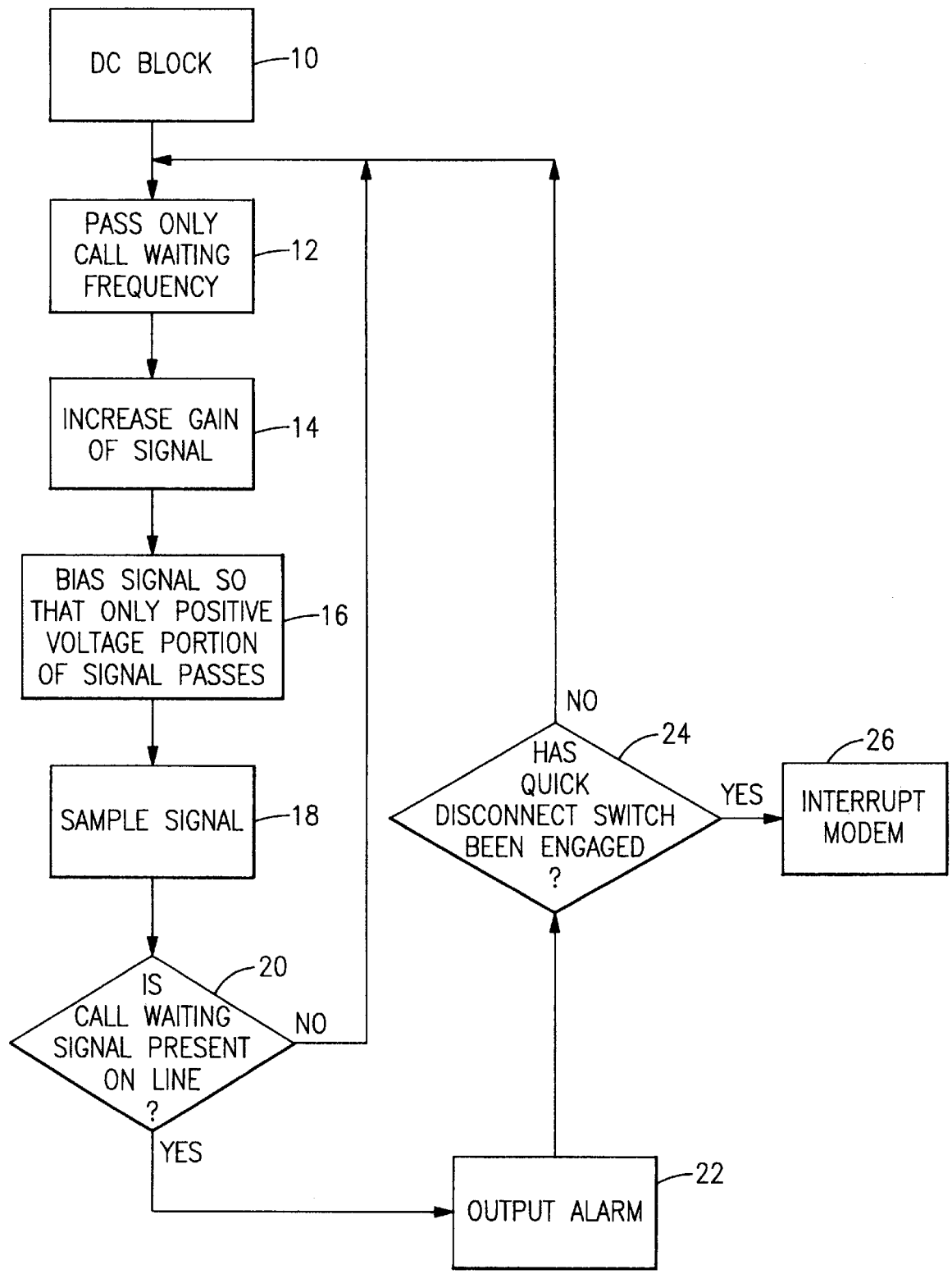
FIG. 5 is a functional block diagram of the circuit embodiment of FIG. 4.

Now turning to FIG. 4, a circuit diagram of the call pending indicator 200 is shown. FIG. 4 will be described in conjunction with FIGS. 5 and 6 in order to gain a better understanding of the present invention. Referring to FIG. 5, there is shown a block diagram of a method for detecting a call waiting signal on a telephone line where a modem is currently transmitting data over the telephone line. There is included an option of interrupting the modem and receiving the telephone call.

Before describing the diagrams of FIGS. 4 and 5, and for background purposes, it is important to note that information passing over a modem consists of direct current line signals along with various alternating current signals of continuously changing frequencies. The call waiting tone is embedded in the various other signals on the line. The first step in the method shown in FIG. 5, therefore, is to isolate the call waiting tone from the telephone line.

Referring again to FIG. 5, there is shown the step of isolating the direct current signals from the alternating current signals, represented by block 10. This isolation of the direct current signals is accomplished by capacitor 100 of FIG. 4. The alternating current signals then pass into a second-order bandpass positive-feedback active filter 102 of FIG. 4. At this point, according to block 12 of FIG. 5, only the call waiting frequency will be allowed to pass through active bandpass filter 102.

Active bandpass filter 102 includes a series of resistors 104, 106, 108, 110, 116 and 118, capacitors 120 and 122, and operational amplifiers 124 and 126 and are connected as shown in FIG. 4. The values of the components of active bandpass filter 102 are selected such that the center frequency $f_0$ is centered at the call waiting frequency with a bandwidth of approximately 35 Hz and a gain (K) of approximately 85.

Because of the diversity of different modem baud rates (e.g., 300 baud, 1200 baud, 14.4 k baud, 28.8 k baud and 56 k baud) the modem signal contains significant amplitude frequency components at the call waiting tone as well as at all of the audible spectrum during normal data transfer even when the call waiting tone is not present. The higher baud rate modem protocols have abrupt changes in phase and frequency to indicate to the receiving modem that a bit transition has occurred. This slewing of frequency and phase causes the frequency spectrum to have the significant amplitude frequency component at the call waiting tone as well as at all of the audible spectrum. The end result of this slewing is that false alarms would be very prevalent if only a standard filter were used. Consequently, an active bandpass filter 102 substantially eliminates false alarms.

Voltage divider resistors 112 and 114 serve as bias resistors to keep operational amplifier 126 in a quiescent operating region at approximately one half of the battery voltage $V^+$.

A capacitor 128 connected between the output of the active bandpass filter 102 and the input of an operational amplifier 130 acts as a de-couple capacitor that allows the call waiting frequency signals to pass but blocks direct current voltage from the output of operational amplifier 126 from disturbing the operating range of the operational amplifier 130.

The combination of resistors 132, 134 and 136 and operational amplifier 130 form a Class-C amplifier that increases the signal amplitude by a predetermined gain factor such that the signal is discernable to a microcontroller 138, as indicated by block 14 of FIG. 5. Further, operational amplifier 130 biases the call waiting signal so that only the positive voltage portion of the call waiting signal is allowed to pass as indicated in block 16 of FIG. 5 (shown in FIGS. 7 and 8). The operational amplifier 130 also increases the signal to noise ratio of the call waiting signal, which results in fewer false alarms as the microcontroller 138 attempts to sample the signal, explained more fully below. The Class-C operation extends the dynamic range of the amplifier to provide amplitudes of the signal in the positive direction large enough to trigger logic circuitry.

Figure 6:
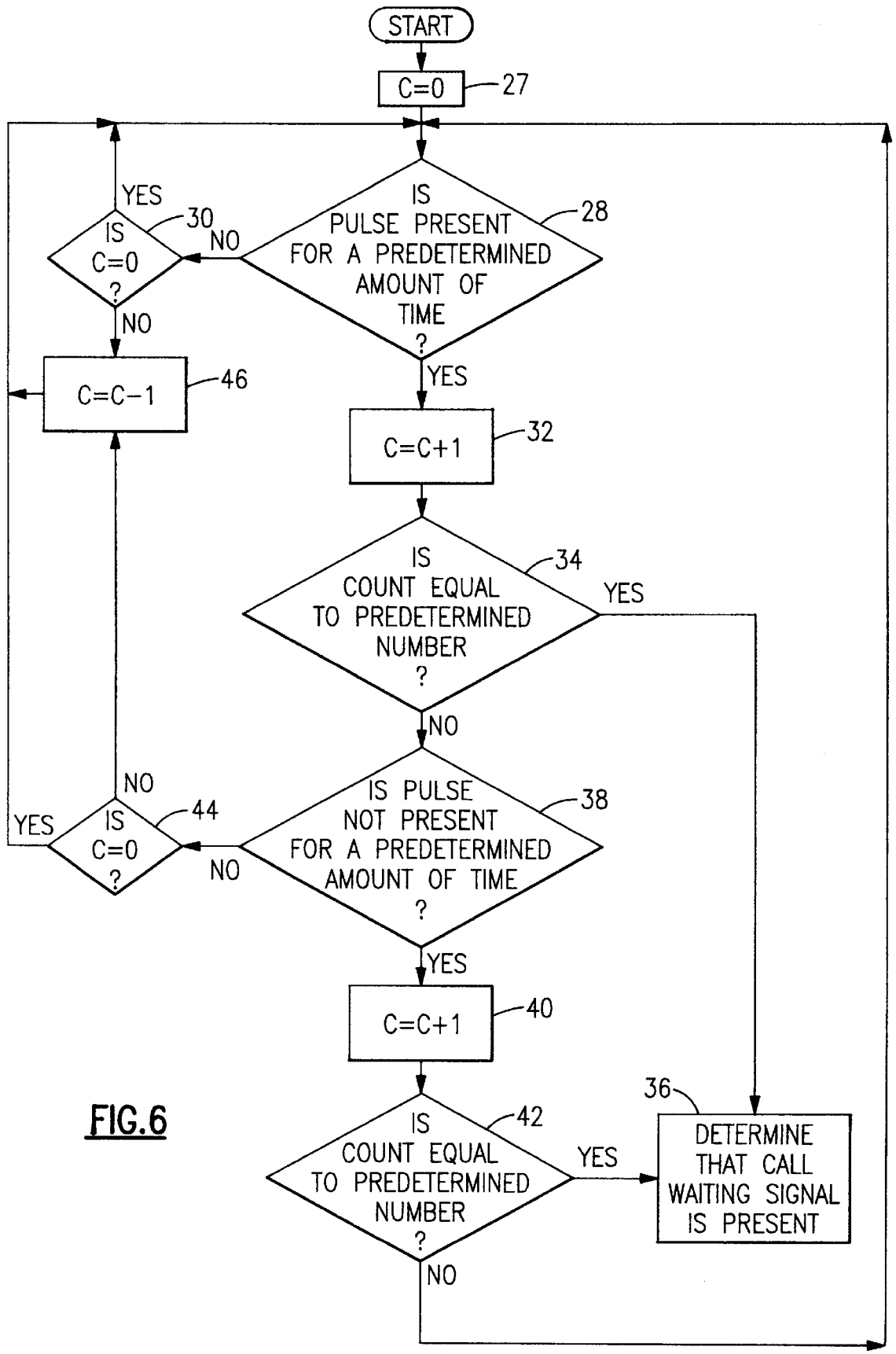
FIG. 6 is a functional block diagram illustrating the steps for determining if an incoming signal is a call waiting signal.

As shown in blocks 18 and 20, the next steps sample the signal that is output from the operational amplifier 130 to determine if the biased gained signal is representative of a call waiting signal. A preferred sampling technique for determining if a signal is a call waiting signal is depicted by the block diagram of FIG. 6. All of the steps of FIG. 6 are performed by microcontroller 138. Initially, an up-down counter in microcontroller 138 is set to zero, represented in block 27. Block 28 shows the step of verifying that the positive voltage signal is present for a predetermined time, which will be described in detail further below. If the positive voltage signal is present for a predetermined time (1.135 milliseconds according to this embodiment) as determined by microcontroller 138, then the count on an up-down counter is incremented by one, represented as block 32, otherwise the count on the up-down counter is decremented by one, block 46. If the count reaches a predetermined number, then a call waiting signal is determined to be present, represented as blocks 34 and 36. The count is never allowed to be less than zero, as shown by, blocks 30 and 44. If the count reaches zero, the system always resets and checks for the positive voltage portion of the call waiting signal, as shown in block 28.

After checking the positive voltage portion of the rectified call waiting signal, the microcontroller 138 determines if the zero voltage portion of the rectified call waiting signal is present for the predetermined amount of time (in this instance 1.135 milliseconds according to the present embodiment), shown as block 38, which will be described in detail further below. Once again, if the zero voltage portion of the rectified call waiting signal is present, then the count on the up-down counter of microcontroller 138 is incremented by one, represented as block 40, otherwise the count on the up down counter is decremented by one, block 46. If the count equals a predetermined number, then a call waiting signal is present, represented as blocks 42 and 36.

The method of FIG. 5 is now described by an example. Assume that a call waiting signal is being transmitted over the line, but that instead of the fourth and fifth pulses being zero and positive respectively, there is an error in the signal and both are zero. After it is determined that the first pulse of the signal is representative of the first pulse of a call waiting signal, block 28 of FIG. 6, the count is incremented to one. After the zero voltage pulse is determined to be that of a rectified call waiting signal, block 38, the count is then incremented to two. This process repeats itself for the third and fourth pulses with the count reaching four. However, on the fifth pulse, the call pending indicator 200 will be looking for a positive voltage pulse, but instead will read a zero voltage pulse. At this point, one will be decremented from the count, represented as block 46, thereby leaving the count at three. Assuming that the next seven pulses are also read by the call pending indicator 200 as not being a rectified call waiting signal, the count will be left at zero. Further assuming, that on the thirteenth pulse, the call pending indicator 200 reads the positive pulse as being representative of a positive pulse of a rectified call waiting signal, the counting will then resume. In a 440 hertz signal there are approximately 440 determinations to be made in 0.5 seconds, since there are two pulses per cycle and 440 cycles per second. As noted and once the count reaches a predetermined number, a determination is made that a call waiting signal is present on the telephone line.

Now turning to FIG. 4 and to explain what is happening electronically as the system determines if a call waiting signal is present, microcontroller 138 receives the filtered 440 hertz signal from operational amplifier 130 and executes two principle functions. First, microcontroller 138 verifies that the pulse width of each positive cycle of the rectified call waiting signal is 1.135 milliseconds and is followed by 1.135 milliseconds of zero voltage for a total period (T) of approximately 2.27 milliseconds. Microcontroller 138 verifies the pulse width of a positive cycle by sampling the positive cycle a first predetermined number (N) of samples. At each sample, the microcontroller 138 will determine if the voltage is greater than a minimum voltage ($V_{threshold}$). The call waiting positive voltage signal pulse is positively verified if a second predetermined number (M) times out of a possible first predetermined number (N) samples are above $V_{threshold}$, called M/N sampling, shown in FIG. 10.

Figure 10:
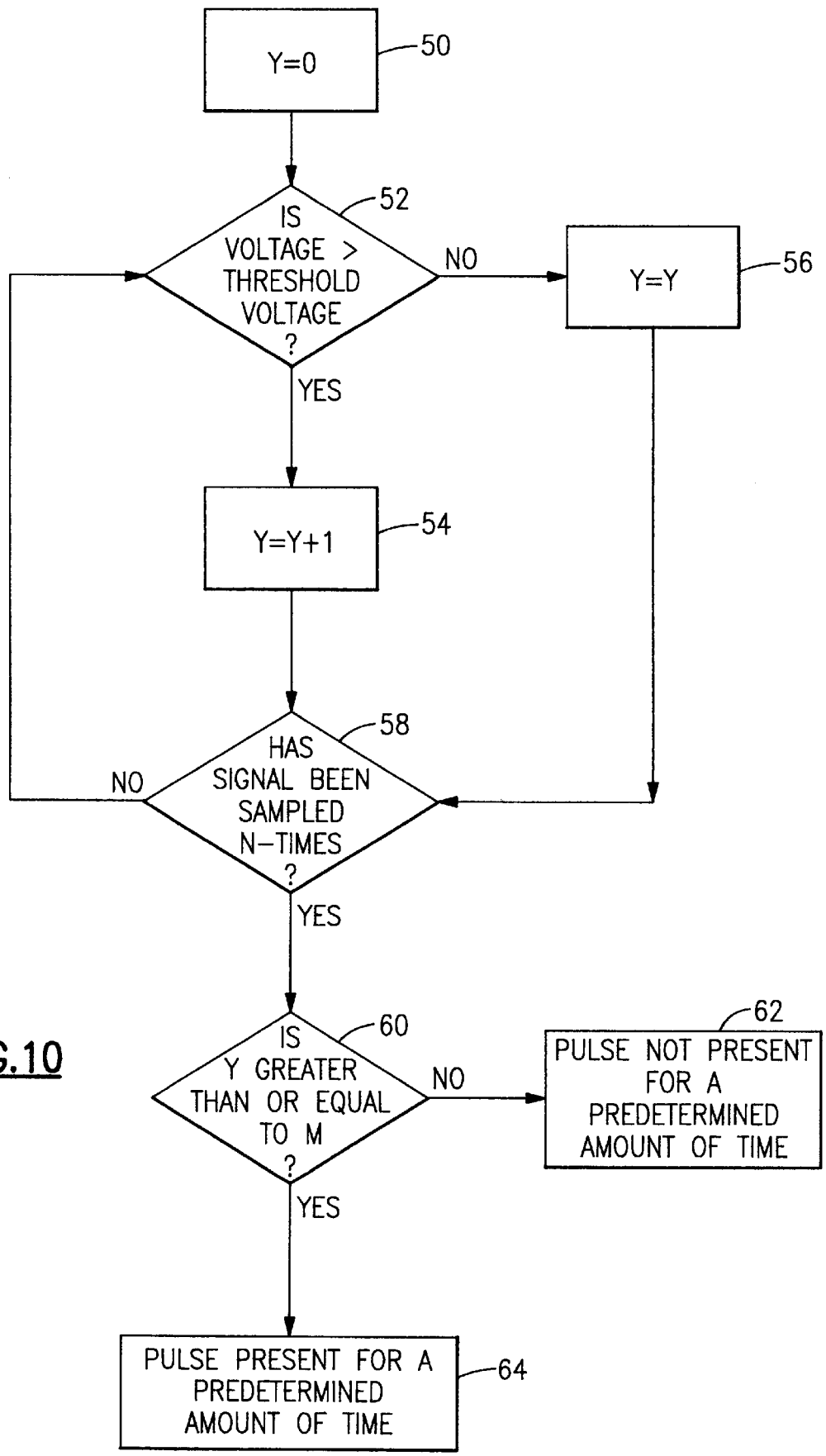
FIG. 10 is a functional block diagram illustrating the steps for determining if an individual pulse is representative of a positive voltage pulse of a call waiting signal.

Now turning to FIG. 10, there is shown a block diagram for the steps of sampling a positive voltage pulse according to the present invention. Initially, a dummy variable "Y" is set equal to zero, represented as block 50. Then it is determined if the voltage in the pulse is greater than $V_{threshold}$, block 52, and if so, then Y is incremented by one, block 54, otherwise Y is not incremented, block 56. Next, if the pulse has not been sampled N times then it will be sampled again, as represented by blocks 58 and 50. If the pulse has been sampled N times, then it is determined whether Y is equal to or greater than M, represented as blocks 58 and 60. If Y is equal to or greater than M, then it is determined that a positive voltage pulse is present for a predetermined amount of time, represented as blocks 60 and 64. Otherwise it is determined that a positive voltage pulse is not present for a predetermined amount of time, represented as blocks 60 and 62.

Figure 11:
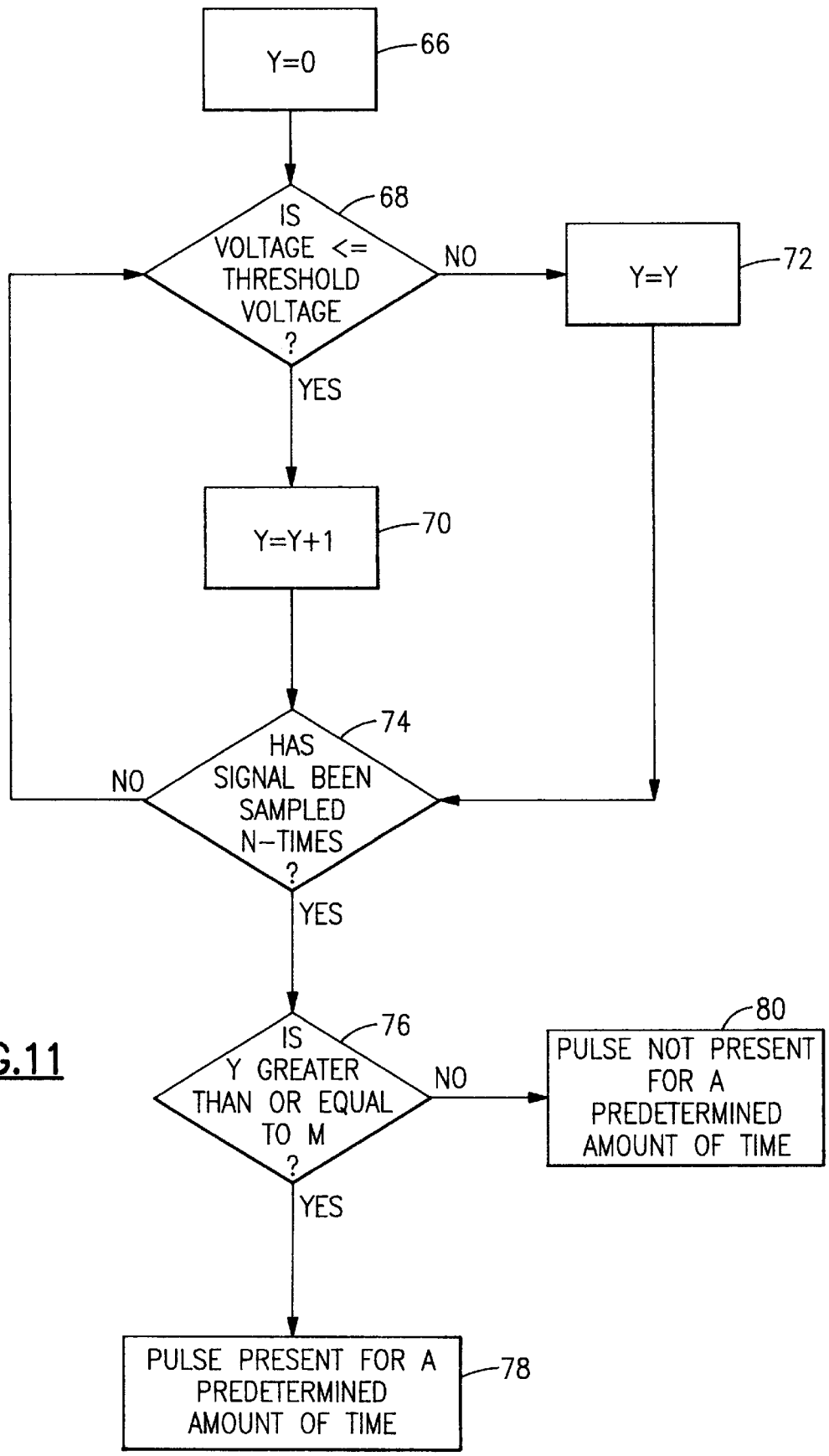
FIG. 11 is a functional block diagram illustrating the steps for determining if an individual pulse of a rectified signal is representative of a zero voltage pulse of a rectified call waiting signal.

If a positive pulse is present for a predetermined amount of time, then the microcontroller 138 will sample for a zero voltage pulse according to FIG. 11. Initially, the dummy variable "Y" is set equal to zero, represented as block 66. A determination is then made as to whether the voltage of the pulse is less than or equal to the $V_{threshold}$, block 68, and if so, then Y is incremented by one, block 70, otherwise Y is not incremented, block 72. If the pulse has not been sampled N times, then the pulse will be will be sampled again, as represented by blocks 74 and 68. If the pulse has been sampled N times, then a determination is made as to whether Y is equal to or greater than M, represented by blocks 74 and 76. If Y is equal to or greater than M, it is then determined that a zero voltage pulse is present for a predetermined amount of time, represented as blocks 76 and 78. Otherwise, a zero voltage pulse is not present for a predetermined amount of time, represented as blocks 76 and 80.

The process of alternately sampling for positive voltage pulses and zero voltage pulses repeats itself for the full period (in this instance, one half second) of a call waiting signal or until a predetermined number (X) of pulses are verified indicating that the signal is a call waiting signal. The purpose of this verification is to discriminate between the call waiting signal and other random noise and extraneous modem signals, which can have an effect on the signal as shown in FIG. 10.

Figure 7:
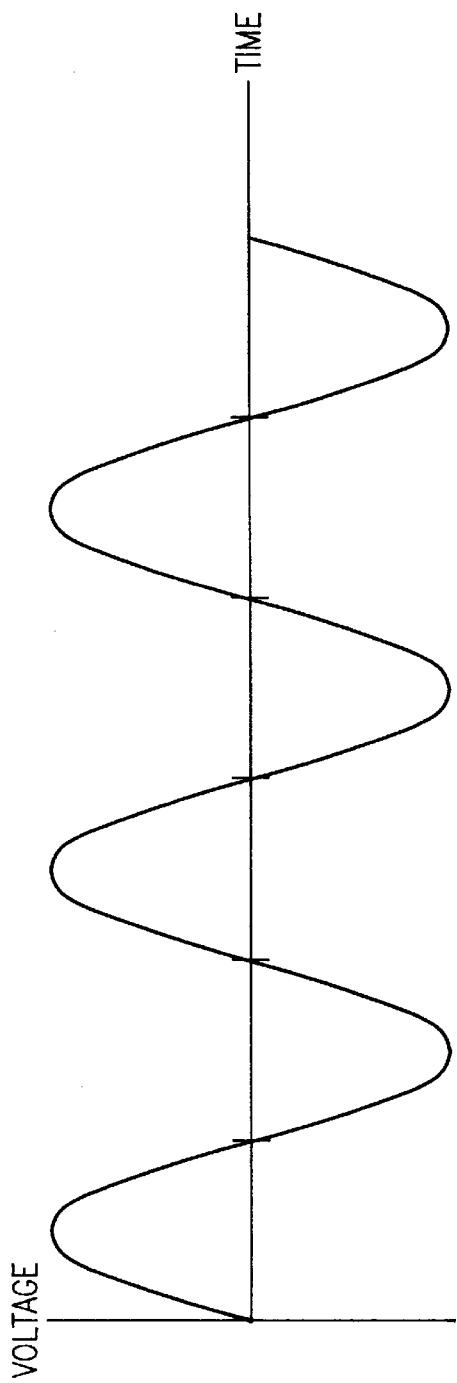
FIG. 7 is a graphical representation of a non-biased call waiting signal.
Figure 8:
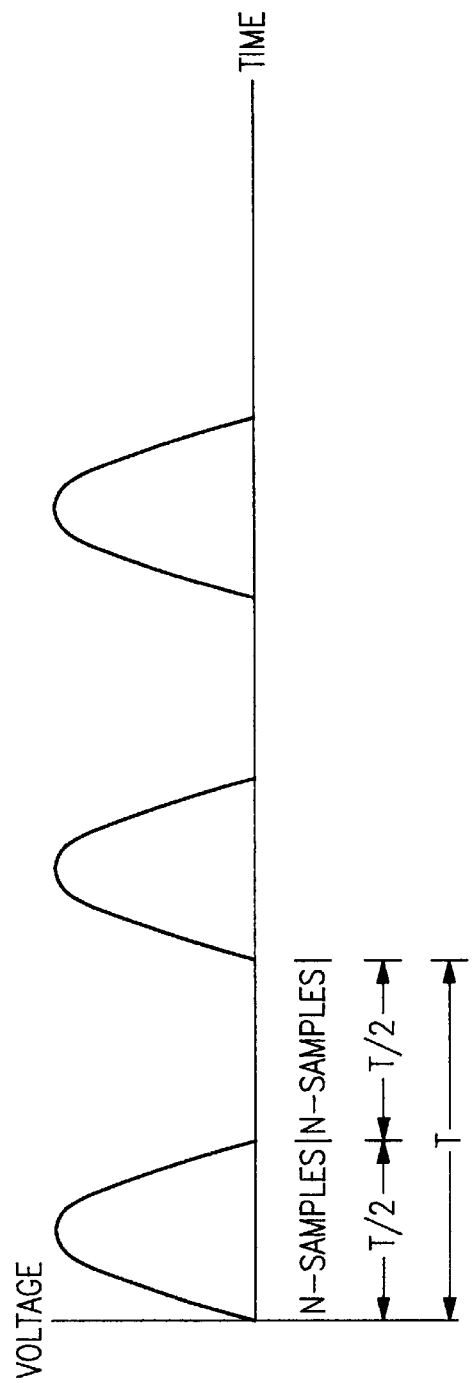
FIG. 8 is a graphical representation of the call waiting signal of FIG. 7 being rectified to show only positive voltages.
Figure 9:
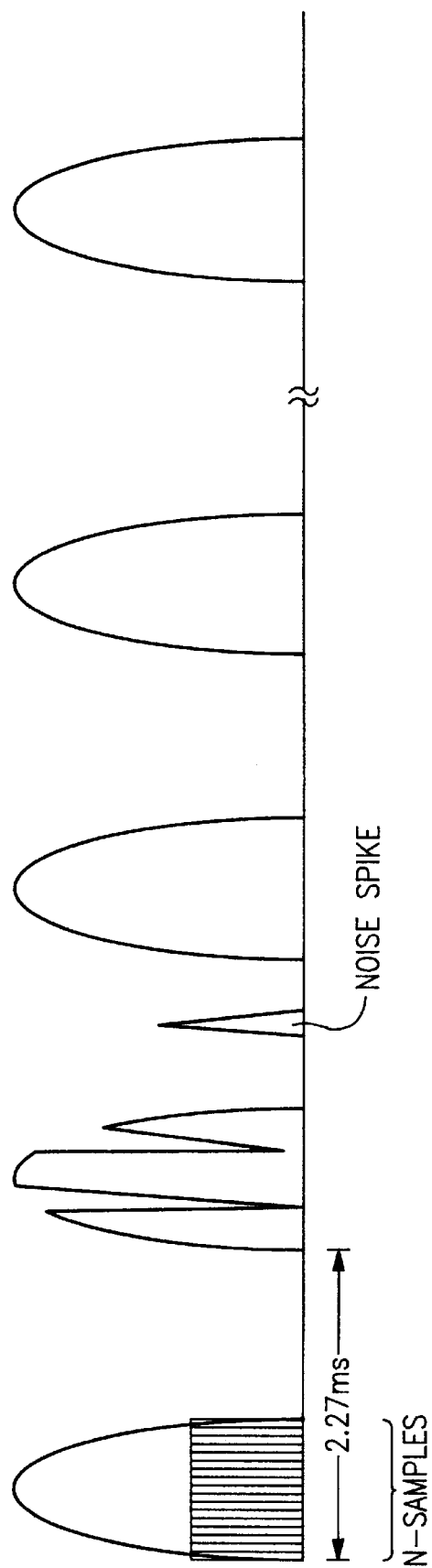
FIG. 9 is a representation of the rectified call waiting signal of FIG. 8 showing the effects line noise.

In an alternative embodiment, the call waiting signal can be passed to microcontroller 138 without first rectifying the signal to remove the negative voltage pulses. This non-biased call waiting signal is shown in FIG. 7. The signal is sampled in the same manner as described above, except that instead of sampling zero voltage pulses, negative voltage pulses are now sampled. If M times out of N samples are less than $-V_{threshold}$, then a call waiting negative voltage signal pulse is positively verified, shown in FIG. 12.

Figure 12:
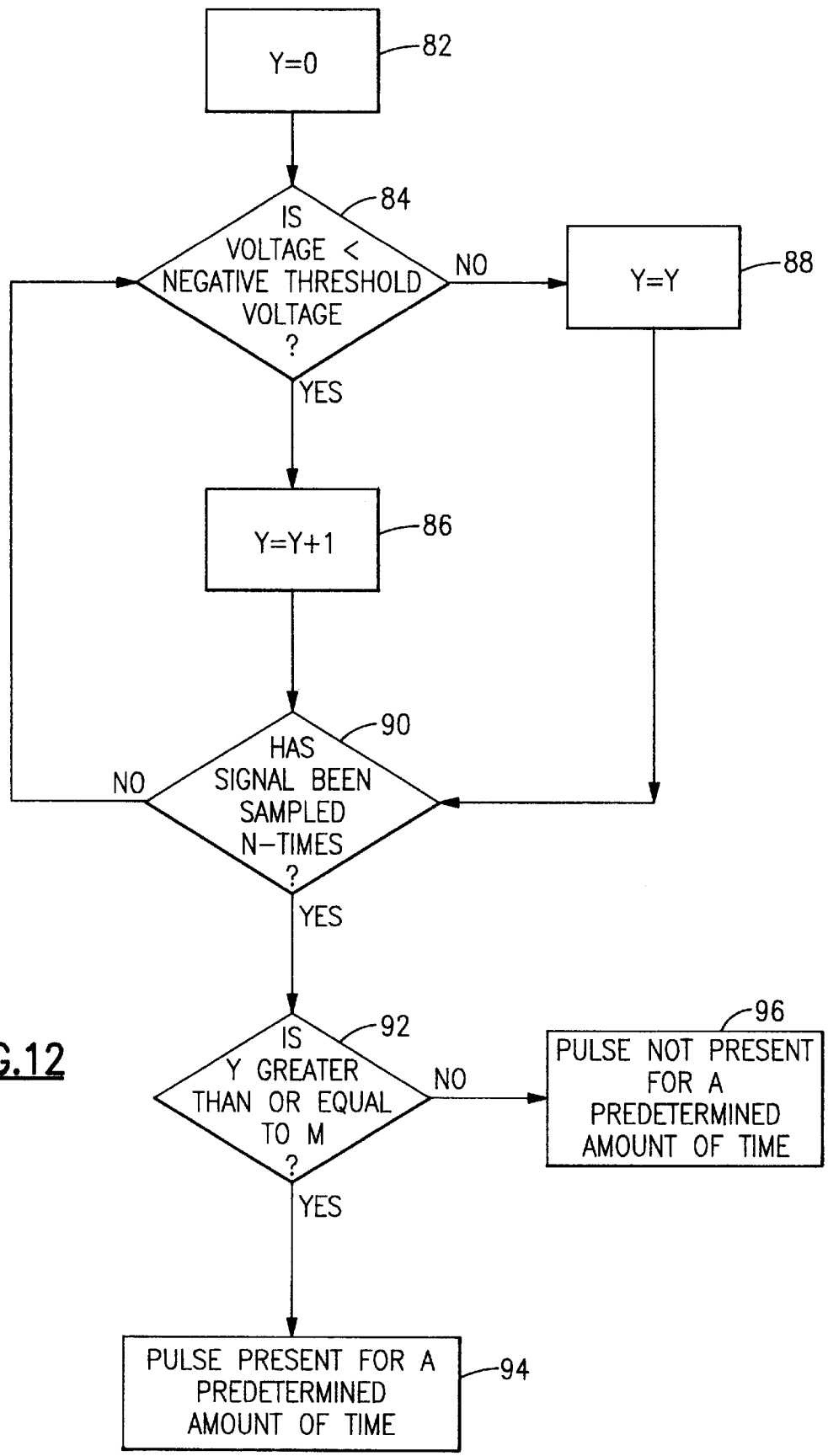
FIG. 12 is a functional block diagram illustrating the steps for determining if an individual pulse is representative of a negative voltage pulse of a call waiting signal.

In FIG. 12, the microcontroller samples for a negative voltage pulse. Initially, the dummy variable "Y" is set equal to zero, represented as block 82. Then it is determined if the voltage in the pulse is less than or equal to a negative $V_{threshold}$, block 84, and if so, then Y is incremented by one, block 86, otherwise Y is not incremented, block 88. Next, if the pulse has not been sampled N times then the pulse will be will be sampled again, as represented by blocks 90 and 84. If the pulse has been sampled N times, a determination is made as to whether Y is equal to or greater than M, represented as blocks 90 and 92. If Y is equal to or greater than M, then a negative voltage pulse is known to be present for a predetermined amount of time, represented as blocks 92 and 94. Otherwise, a negative voltage pulse is not present for a predetermined amount of time, represented as blocks 92 and 96.

As can be clearly seen, only the call waiting signal is sampled in order to determine if there is in fact an incoming call pending. Any sampling outside of the call waiting signal, for example the ten second delay period in between signals, will result in the count being brought down to zero. Consequently, the call pending indicator of the present invention will determine in approximately 0.5 seconds or less whether there is a call waiting signal on the telephone line.

Turning back to FIGS. 4 and 5, and once a call waiting signal is verified, the microcontroller 138 preferably triggers a sound circuit 140 to output an audio alarm to a speaker 142 indicating the presence of a call waiting signal on the phone line, represented as blocks 20 and 22. In addition, the microcontroller 138 also displays a video alarm 152 on the call pending indicator 200 as a means of also visually indicating the presence of a call waiting signal on the telephone line.

Internet quick disconnect switch 290 can be engaged to quickly disconnect the computer modem from the Internet service provider, also shown by blocks 24 and 26 of FIG. 4, thus allowing the user ample time to answer the waiting telephone call. As a reminder to the user, a computer disconnect alarm 146 is engaged by the closure to ground of one of the normally open contacts of switch 290.

In the foregoing specification, the invention has been described with reference to a specific embodiment thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method for detecting the presence of a call waiting signal on a telephone line having multiple signals, wherein said telephone line is actively electrically connected with a modem, said call waiting signal comprises a first call waiting signal having individual positive voltage pulses alternating with individual negative voltage pulses each being of a known duration, a delay period and then a second call waiting signal having individual positive voltage pulses alternating with said individual negative voltage pulses, said method comprising the steps of:

isolating a signal of a given frequency from said telephone line; and confirming that the duration of a portion of said signal substantially corresponds to the duration of one of said voltage pulses of said first call waiting signal prior to the beginning of said delay period.

2. The method of claim 1, wherein said detecting step further includes the step of sampling said individual pulses of said first call waiting signal and counting the number of pulses that are representative of a call waiting signal.

3. The method of claim 2, said sampling step further includes the step of individually sampling said individual positive voltage pulses and said individual negative voltage pulses and counting the number of individually sampled pulses that are representative of a call waiting signal.

4. The method of claim 3, wherein said detecting step further includes the step of detecting the presence of said call waiting signal when said counting reachers a predetermined number.

5. The method of claim 1, wherein said isolating step further includes the steps of blocking direct current signals and then blocking substantially all frequencies except that of the call waiting signal.

6. The method of claim 5, wherein said isolating step further includes the step of biasing said call waiting signal so that said biased call waiting signal includes individual positive voltage pulses alternating with individual zero voltage pulses.

7. The method of claim 6, wherein said detecting step further includes the steps of individually sampling said individual positive voltage pulses and said individual zero voltage pulses and counting the number of individually sampled pulses that are representative of a biased call waiting signal.

8. The method of claim 7, wherein said detecting step further includes the step of detecting the presence of said call waiting signal when said counting reaches a predetermined number.

9. The method of claim 8, further including the step of outputting an alarm after the presence of a call waiting signal is determined.

10. The method of claim 9, further including the step of disconnecting said modem from said telephone line.

11. The method of claim 10, wherein said isolating step further includes the steps of increasing the gain of said call waiting signal before biasing said call waiting signal, and increasing the gain of said biased call waiting signal.

12. The method of claim 1, further including the step of outputting an alarm after the step of detecting the presence of said call waiting signal.

13. The method of claim 1, further including the step of disconnecting said modem from said telephone line after the step of detecting the presence of said call waiting signal.

14. The method of claim 1, wherein detecting step further includes the steps of individually sampling said individual positive voltage pulses, and counting the number of individually sampled positive voltage pulses that are representative of a positive voltage pulse of a call waiting signal.

15. The method of claim 1, wherein detecting step further includes the steps of individually sampling said individual negative voltage pulses and counting the number of individually sampled negative voltage pulses that are representative of a negative voltage pulse of a call waiting signal.

16. An apparatus for detecting the presence of a call waiting signal on a telephone line, said call waiting signal having a first call waiting signal having a known duration, a delay period and then a second call waiting signal, said apparatus comprising:
a modem electrically connected with said telephone line; and
an indicator electrically connected with said telephone line, said indicator being electrically connected to said modem, but physically separate from said modem,
wherein said indicator includes an isolating means for isolating a signal of a given frequency from said telephone line, and a confirming means for confirming that the duration of a portion of said signal substantially corresponds to the duration of part of said first call waiting signal before the beginning of said delay period, said indicator further including alarming means for outputting an alarm when said call waiting signal is detected.

17. The apparatus of claim 16, wherein said indicator further includes a disconnect switch for disconnecting said modem from said telephone line.

18. A device for indicating the presence of a call waiting signal on a telephone line, wherein said telephone line is actively electrically connected with a modem, said call waiting signal having a first call waiting signal having a known duration, a delay period and then a second call waiting signal, said device comprising:
isolating means for isolating a signal of a given frequency from said telephone line, said isolating means being electrically connected to but physically separate from said modem;
a confirming means for confirming that the duration of a portion of said signal substantially corresponds to the duration of part of said first call waiting signal before the beginning of said delay period, said confirming means being electrically connected to but physically separate from said modem; and
indicator means responsive to said detector means for providing user understandable indicia indicating reception of said call waiting signal, said indicator means being electrically connected to but physically separate from said modem.

19. The device of claim 18, wherein said indicator means includes audio indicator means.

20. The device of claim 18, wherein said indicator means includes video indicator means.

21. The device of claim 18, further including disconnecting means, said disconnecting means for disconnecting said telephone line from said modem.

22. The device of claim 18, wherein said isolating means further includes an active filter.

23. A system for receiving and processing a call waiting signal from a telephone line, said telephone line electrically connected to a modem, said telephone line carrying a plurality of signals including a call waiting signal, said call waiting signal having a first call waiting signal having a known duration, a delay period and then a second call waiting signal, said system comprising:
a modem, said modem being adapted to transfer data between a computer and said telephone line; and
an indicator for receiving and processing said call waiting signal, said indicator being electrically connected to but physically independent of said modem and said telephone line, wherein said indicator includes isolating means for isolating a signal of a given frequency from said telephone line, and confirming means for confirming that the duration of a portion of said signal substantially corresponds to the duration of part of said first call waiting signal prior to the beginning of said delay period.

24. The system of claim 23, wherein said indicator further includes indicator means responsive to said detector means for providing user understandable indicia indicating reception of said call waiting signal.

25. The system of claim 23, wherein said indicator further includes an audio indicator.

26. The system of claim 23, wherein said indicator further includes a video indicator.

27. The system of claim 23, wherein said indicator further includes a disconnect means, said disconnect means for disconnecting said telephone line from said modem.

28. The call waiting monitor of claim 18, wherein said isolation means comprises a capacitor connected in series with an active filter for allowing only the call waiting frequency to pass through while blocking substantially all other frequencies.

29. The call waiting monitor of claim 28, wherein said disposed active filter is a second-order bandpass positive-feedback active filter, having a center frequency $f_0$ centered at the call waiting frequency, a bandwidth of approximately 35 Hz, and a gain of approximately 85.

30. The call waiting monitor of claim 28, wherein said isolation means further comprises a Class-C amplifier disposed after said active filter, said Class-C amplifier for increasing the signal amplitude by a predetermined gain factor, and for rectifying the call waiting signal, and for increasing the signal to noise ratio of the call waiting signal.

31. The call waiting monitor of claim 18, said call waiting monitor being electrically in common with a network telephone line.

32. The call waiting monitor of claim 18, said call waiting monitor being coupled to a user telephone line such that said monitor is electrically parallel with the user modem.

33. The call waiting monitor of claim 18, wherein said confirming means is a time interval discriminator.

34. The call waiting monitor of claim 18, said confirming means includes a sampling means for sampling a residual signal output from said isolation means to determine if the biased gained signal is representative of a call waiting signal and not some other random signal.

35. The call waiting monitor of claim 34, wherein said sampling means is a microcontroller.

36. The call waiting monitor of claim 34, wherein said sampling means continuously confirms that a positive voltage portion of the call waiting is present for a first time period, and then confirms that a second voltage portion of the call waiting signal is present for a second time period.

37. The call waiting monitor of claim 36, wherein said second voltage portion of the call waiting signal is a zero voltage portion of a biased call waiting signal.

38. The call waiting monitor of claim 36, wherein said second voltage portion of the call waiting signal is a negative voltage portion of the call waiting signal.

39. The call waiting monitor of claim 19, further comprising a disconnecting means for disconnecting the modem from the telephone line without terminating an existing Internet connection.

40. A method for detecting the presence of a call waiting signal on a telephone line carrying multiple signals, wherein said telephone line is connected to a modem, wherein said call waiting signal comprises at least a first portion and a second portion, then a delay period, and then a second call waiting signal, said method comprising the steps of:

isolating at least one isolated signal having a given frequency from said multiple signals; and confirming that the duration of a portion of said signal isolated substantially corresponds a duration of said first portion prior to the beginning of the delay period.

* * * * *

UNITED STATES PATENT AND TRADEMARK OFFICE
CERTIFICATE OF CORRECTION

PATENT NO. : 6,067,353 Page 1 of 1
DATED : May 23, 2000
INVENTOR(S) : Philip C. Szeliga It is certified that error appears in the above-identified patent and that said Letters Patent is hereby corrected as shown below:

<u>Column 8,</u>
Line 55, please change the word "detecting" to read -- confirming --.
Line 64, please change the word "detecting" to read -- confirming --.

<u>Column 9,</u>
Line 9, please change the word "detecting" to read -- confirming --.
Line 15, please change the word "detecting" to read -- confirming --.
Line 29, please change the word "detecting" to read -- confirming --.
Line 33, please change the word "detecting" to read -- confirming --.
Line 34, please change the word "detecting" to read -- confirming --.
Line 39, please change the word "detecting" to read -- confirming --.

<u>Column 10,</u>
Line 15, please change the word "detector" to read -- confirming --.
Line 50, please change the word "detector" to read -- confirming --.

Signed and Sealed this

Eighth Day of April, 2003

JAMES E. ROGAN
*Director of the United States Patent and Trademark Office*